US005090102A

United States Patent [19]

Lovell

[11] Patent Number: 5,090,102

[45] Date of Patent: Feb. 25, 1992

[54] DIESEL INJECTOR SLEEVE REMOVER

[76] Inventor: Paul H. Lovell, P.O. Box 136, Theriot, La. 70397

[21] Appl. No.: 607,334

[22] Filed: Sep. 20, 1990

Related U.S. Application Data

[63] Continuation of Ser. No. 406,153, Sep. 12, 1989, abandoned.

[51] Int. Cl.[5] .............. B23P 19/04

[52] U.S. Cl. .............. 29/255

[58] Field of Search .............. 29/254, 255, 263, 264, 29/282, 283, 234

[56] References Cited

U.S. PATENT DOCUMENTS 1,177,843 4/1916 Ackerman et al. .............. 29/263
1,381,101 6/1921 Albertson .............. 29/263
2,380,068 7/1945 Patton .............. 29/255
3,529,497 9/1970 Brooks .............. 29/254
3,535,765 10/1970 Denehie .............. 29/263
4,476,598 10/1984 Beauregard .............. 29/255

*Primary Examiner*—Robert C. Watson
*Attorney, Agent, or Firm*—Alexander Norcross

[57] ABSTRACT

A tool for removing a Diesel Injector Sleeve from a Diesel engine head is built of a split, threaded expander section within which is mounted at plunger having an angled end. The plunger extends to form a handle upon which slides a weighted hammer section.

The tool is inserted into the neck of an injector tube. A downward blow with the hammer drives the expander over the plunger, expanding the threads into the sidewall of the tube and creating a positive connection with the injector tube. An upward blow then pulls the plunger into the expander, maintaining a positive connection and imparting an upward force that draws the entire tube out of the head.

The expander preferably has a screw thread so that the injector tube may be removed from the tool by twisting it off the expander.

The tool will engage and pull an injector tube with only a partial thread engagement. A simple insertion and blow sets the expander into the injector tube; a reverse blow pulls the injector tube without requiring removal of the engine head.

3 Claims, 2 Drawing Sheets

DIESEL INJECTOR SLEEVE REMOVER

This is a continuation of application Ser. No. 07/406,153, filed on Sept. 12, 1989, now abandoned.

BACKGROUND OF THE INVENTION

This invention relates to the field of hand tools for pulling tightly fit sleeves or tubes from their mounting enclosure.

Wendler U.S. Pat. No. 4,110,886 discloses a tool for removing a diesel injector. This tool, as many of the tools disclosed below, involves the use of a journaled impact hammer or cylindrical driving member sliding on a shaft to provide an impact pulling force. The active end of the tool is a head sized to closely fit within the central bore of a diesel injector, with a transverse, spring loaded pin which is adapted to mate with the transverse fuel passages of the injector. Means are provided for limiting the travel of the pin into the transverse fuel passage and for removing the pin from the transverse fuel passage so as to remove the injector from the head.

Brooks U.S. Pat. No. 3,529,497 discloses, within the context of a dowel removing tool, a reciprocating plunger tool ending in an active tip which has an outward taper journaled to fit within an outer cylindrical member. The center bore of the tip of the tool is slit for expansion or contraction and provided with internal threads. The tool is manipulated by fitting the internal threads over a dowel pin and then driving the cylindrical member down over the taper to closely engage the threads into the dowel pin. The hammer is then reversed to impose a lifting force on the dowel pin, removing the pin. The dowel pin is solid and therefore, resistant to compressive forces. Only friction changes the threaded section within the cylindrical member during withdrawal.

Hawkins U.S. Pat. No. 4,734,972, discloses a tool for removing a tube plug, a plug for sealing an unusable tube in a boiler. Such a tube plug is an expandable plug set with a tool in which a reverse tapered face on a draw bar (44) expands a toothed plug (42) into the walls of the tube 28 forming a tight seal which is left in place to block passage of fluids through the tube. The resulting tube plug is not split but is a solid plug, permanently expanded by deformation into a bonded relationship with the sidewall of a tube. The remainder of the patent discloses a particular concentric machine for drilling out and removing such an otherwise permanently affixed plug.

U.S. Pat. No. 4,724,608 discloses an apparatus using a pulling shaft with a tapered lowered end, which expands a split collar gripping unit (see FIG. 2 of the patent) so as to engage a shoulder (item 150) with the back of a bushing (10) allowing the bushing to be pulled by the essentially linear force imposed through the shoulder of the bushing port.

A related device, a Bearing Puller, is shown in Hacker U.S. Pat. No. 4,507,838. The puller utilizes a tapered plug to expand an otherwise contracted cylinder which is inserted through the axis of the bearing and then expanded to engage the rear shoulders.

A third form is shown in Patton U.S. Pat. No. 2,380,068 as an oil seal puller. The tapered internal expanding plug is reversed in direction and is driven into the toothed expansion member, forcing it apart to engage the seal.

Filer U.S. Pat. No. 4,280,274 discloses an apparatus for extracting tubes from a heat exchanger in which a multistep apparatus is disclosed. A first split tap thread into the tubes, which are essentially cylindrical and smoothwalled. A separate engaging device, much like the oil seal puller of Patton, is fit into an internal receiving shoulder of the screwed in drill tap to provide for a removing force to pull both drill tap and tube from the boiler.

Both Hawkins and Filer teach that it is necessary to thread an extraction removal extractor unit into the wall of the tube in order to obtain a sufficient contact to provide a suitable pulling force. The patents teaching a reverse expansion device, such as Parrott or Hacker teach such a device not for gripping of the item to be removed but rather for expanding shoulders behind the item so as to impose a pulling force lengthwise along the tube in its strong direction. Brooks, which does teach the use of a tapered end sleeve for compressing a threaded member into an item to be removed, teaches the inward compression against a solid dowel. It would appear that inverting the structure of Brooks would drive the walls of the tube more solidly into the backing support, increasing the friction and resistance to removal; both Filer and Hawkins teach that it is necessary to thread or tap a tube to be removed, screwing a threaded removal into this tap. Hawkins further teaches that expanding a toothed element within a thin walled tube against a backing support is a method of plugging rather than removing the tube.

SUMMARY OF THE INVENTION

The invention is a device for removing a diesel engine injector tube from the head of a diesel engine.

By the way of background, an injection tube is a soft copper lining tube inserted within the head of a diesel engine which provides the pressure seal when a diesel engine injector is screwed into the engine proper. Once an injector has been mounted, the injector tube is deformed into a pressure tight fit into the head of the diesel engine. The method known to the current art for removing an injector tube (when one requires removal because of a leak or a puncture) is to remove the diesel engine head and then to reverse punch through the bottom of the injector tube hole, shearing the injector tube into two sections and forcibly removing it.

The invention comprises a split, threaded expander section within which is mounted a plunger having an angled end. The plunger is part of an extension handle upon which slides a weighted hammer section.

The unit, with the expander journaled on the plunger, is inserted into the injector tube. Full insertion pushes the expander into the neck section of the injector tube. A downward blow with the hammer drives the expander over the plunger, expanding the threads into the sidewall of the tube and creating a positive connection with the injector tube. An upward blow then pulls the plunger into the expander, maintaining the positive connection and imparting an upward force so that the entire tube is pulled from within the head as a unit.

The expander is preferably threaded in a screw thread so that the injector tube, once pulled, may be removed from the tool by twisting it with respect to the expander.

In use the expander will engage and pull an injector tube with only a partial thread engagement and does not require being screwed into the tube. A simple insertion and blow to set the expander into the injector tube and then a reverse blow to pull the expander and the injector tube is sufficient to remove the injector tube without requiring removal of the engine head.

It is thus an object of the invention to show a tool which permits the ready removal of a soft metal tube embedded within a hard metal backing.

It is a further object of this invention to disclose a simple tool for removing diesel engine injector sleeves without requiring removal of the engine head.

This and other objects of the invention may be more clearly seen from the detailed description of the preferred embodiment which follows.

DETAILED DESCRIPTION OF THE PREFERRED EMBODIMENT

Figure 4:
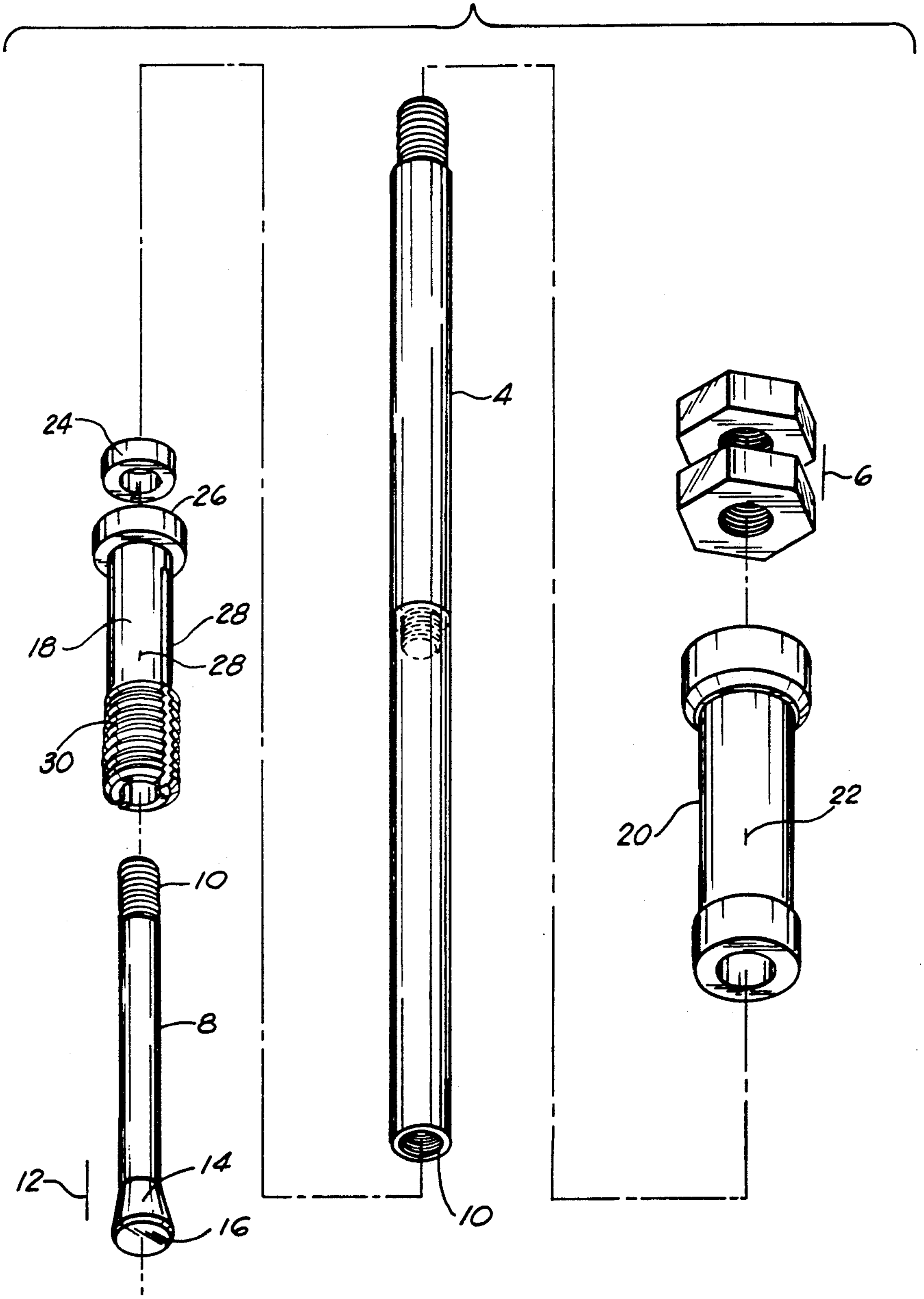
FIG. 4 is an exploded view of the tool.

Referring to the drawings, I show in FIG. 4 a section of a typical diesel engine head containing, within the head, a soft copper injector tube 32. As is known in the art, such injector tubes 32 serve as a gasket sealing a diesel injector, which is a high pressure fuel injection mechanism into the head of the engine preventing blowby and leakage under the high pressures typically encountered in diesel engines.

It is well known that under conditions of wear and overheat such injector tubes will occasionally blow out or perforate, requiring replacement. Equally, when an injector is removed for replacement or servicing, a new tube is required to be inserted so as to provide adequate sealing, injector tubes not being reusable.

Under either condition therefore, it is required that the injector tube 32 which has been deformed into tight contact with the engine head, must somehow be driven out and removed.

Figure 1:
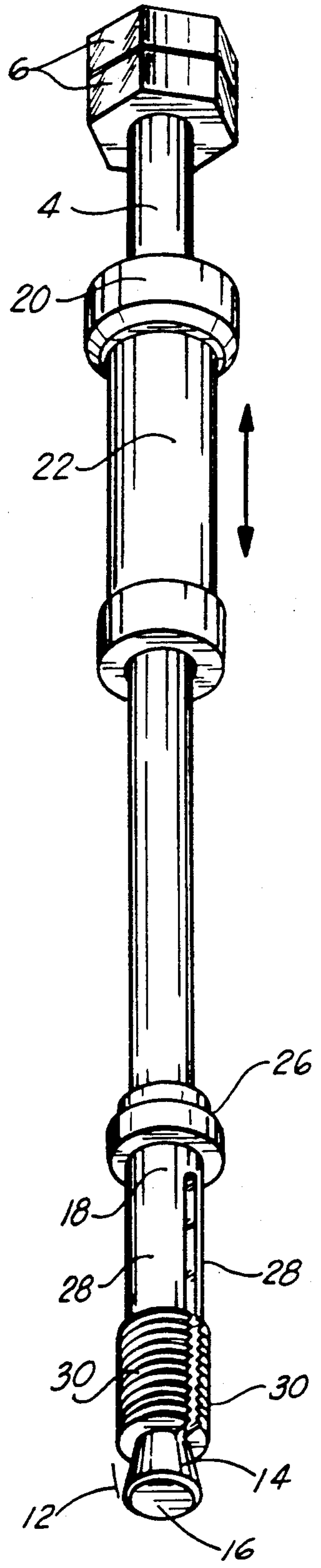
FIG. 1 is an oblique view of the assembled tool.
Figure 2:
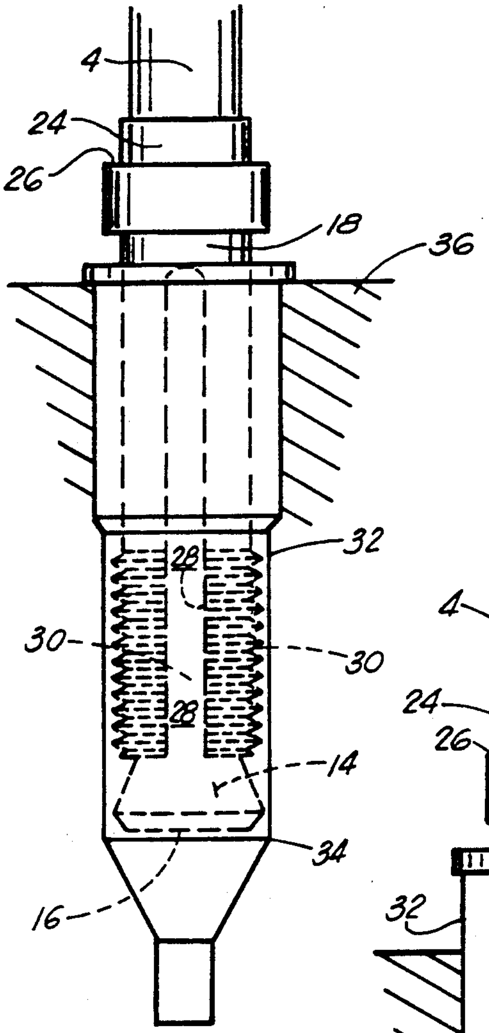
FIG. 2 is a view of the tool as inserted into an injector tube.
Figure 3:
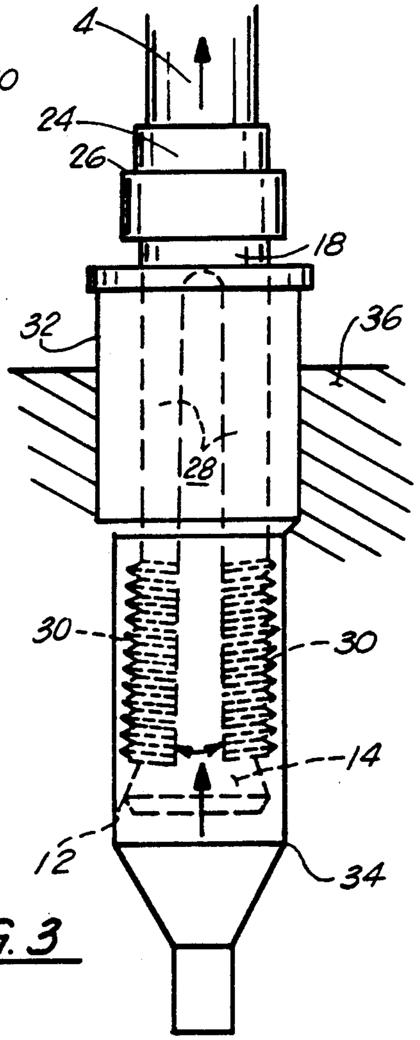
FIG. 3 is a view of the tool as engaged to pull an injector tube.

For this purpose, I provide a tool, the invention herein. Shown in exploded form in FIG. 1, the tool is seen to be built upon a central shaft 4. At an upper end of shaft 4 is provided a handle end 6, an expanded portion, which can be as simple as two jam nuts, closing off the upper end of the shaft 4. The lower end of the shaft 4 is connected to a plunger member 8 by being screwed together at a joint 10. Joint 10 is provided simply for ease of manufacture, breaking the shaft 4 into readily machinable elements, and also permitting the tool to be disassembled in compact form for carrying and storage when not in use. It can be seen that shaft 4 could be equally made of a single uniform shaft element.

Plunger member 8 defines a lower, insertion end 12 of the tool. Insertion end 12 consists of an inverted conical section 14 terminating in an impact tip or impact surface 16. Slidably journaled upon shaft 4 are first an expander member 18 and second, a hammer member 20. Hammer 20 and expander 18 are freely movable along shaft 4, independently of each other.

Hammer member 20 is a cylindrical, relatively heavy hammer having an exterior hand surface 22 adapted for grasping by one hand so that hammer 20 may be slid or manipulated easily along shaft 4. At the end of expander 18 closest to hammer 20 is an impact bushing 24 journaled within expander 18 and forming an impact end of expander 18. At an end of expander 18 opposite this impact end 20, expander 18 is divided into a plurality of downward extending fingers 28. Fingers 28 are slightly flexible, in the sense that they have, under sufficient force, the ability to bend with springlike action outward from the center line of expander 18. However, expander 18 is preferably made from a substantially strong steel tube, and only bends under sufficient force.

The lower end of each of fingers 28 is provided with a serrated or toothed exterior surface 30.

In use it is important to note that the shape of the typical injector tube 32 is of a step tapered construction reducing to a neck 34. Injector tube 32 is of soft copper so as to provide a gasket effect and has been, by the action of inserting and tightening an injector, deformed into tight sealing contact with engine head 36.

In use, the insertion end 12 of the tool is inserted into the injector tube 32, the injector having previously been removed. The tool is inserted until the impact tip 16 is in direct contact with the neck 34 of the injector tube. A sharp, downward blow of hammer 20 upon impact bushing 24 forces expander 18 down against the inverted conical end 14, flexing fingers 28 outward and forcing tooth surface 30 into the soft copper of the injector tube. The injector tube having previously been forcibly inserted into the engine head 36, this outward expansion does not fasten the injector tube any more firmly into the engine. The relative hardness of the tooth surface 30 in comparison with the soft copper of the injector tube 32 insures that the tooth surface 30 engages and interlocks with the injector tube. However, engine head 36 is made of a relatively hard steel or iron construction and is thus unaffected by the insertion.

Hammer 20 is then grasped, and a sharp, upward blow of hammer 20 against handle end 6 imparts a strong upward thrust on shaft 4. This upward pull attempts to pull plunger member 8 through expander 18 Expander 18 is fully engaged into the injector tube and cannot further expand over the inverted conical end 14 of plunger 8. Thus the upward force on plunger 8 drives expander 18 in an outward direction, but maintains expander 18 in a fully expanded state interlocked with the soft copper of the injector tube 32. As a result, the upward force of the second, upward blow of hammer 20 cleanly pulls injector tube 32 free of the engine head.

It is preferable that the toothed surface 30 of the expander 18 be in the form of an interrupted screw thread, as this eases the removal of the injector tube from the expander, once the injector tube has been pulled by the tool. The pulled injector tube can be unscrewed from the expander. This form of threaded tooth surface is not, however, necessary for the operation of the device and other toothed forms will work easily as well in performing the tube removal.

It has further been determined that the device is relatively tolerant of misalignment with the injector tube. There is not a requirement that it be precisely aligned along the axis of the injector tube, and this is an advantage in a hand tool where precision alignment is difficult. In fact, it has been discovered that the tool actually will rock to an extent within the injector tube after the first downward hammer blow and yet still be fully effective in removing the tube during the second upward blow. This downward-upward impact motion is believed to be unique to this particular tool as is the geometry which positively locks the expander to the tube during the withdrawal stroke.

It can thus be seen that the tool is not restricted to the exact embodiment shown but includes that range of equivalents as are claimed.

I claim:

1. An apparatus for the removal of an injector sleeve from an engine block comprising:

an axial shaft having a first handle end and a second, insertion end;

said second, insertion end having an inverted, conical shape;

a toothed, expansion means slidably journaled upon said shaft adjacent said insertion end;

impact hammer means slidably journaled upon said shaft between said expansion means and said handle end;

said expansion means having an impact receiving face for receiving an inserting impact from said sliding hammer; and said handle end having an impact receiving face for receiving a withdrawing impact from said hammer.

2. The apparatus as described in claim 1 wherein said expansion means further comprises:

a tubular member circumferentially enclosing said shaft, slidable thereupon;

a first end having means thereupon for receiving impact;

having a second end divided into plurality of elongate flexible fingers;

having a toothed surface upon each of said fingers, exterior of said shaft;

said fingers being adapted to expand cooperatively with said inverted conical shape.

3. The apparatus as described in claim 2 above wherein said toothed surface further comprises:

an interrupted screw thread.

* * * * *